United States Patent [19]
Hemsworth

[11] 4,244,052
[45] Jan. 6, 1981

[54] RECEIVER WORD ALIGNMENT FOR DIGITAL TRANSMISSION SYSTEMS USING A REDUNDANT TERNARY LINE CODE

[75] Inventor: Alan D. Hemsworth, London, England

[73] Assignee: International Standard Electric Corporation, New York, N.Y.

[21] Appl. No.: 16,660

[22] Filed: Mar. 1, 1979

[51] Int. Cl.³ .................. H04L 7/06; H04L 25/34
[52] U.S. Cl. ............................... 375/19; 375/20; 375/113; 371/56
[58] Field of Search .............. 340/146.1 AB, 146.1 D; 325/38 R, 38 A, 41; 178/68, 69.1; 179/15 BS; 375/17, 19, 20, 106, 110, 113; 371/56

[56] References Cited

U.S. PATENT DOCUMENTS

| 3,920,900 | 11/1975 | Fineman | 340/146.1 D |
| 3,942,152 | 3/1976 | Pettersson | 340/146.1 D |
| 4,010,421 | 3/1977 | Lind | 178/68 |
| 4,087,642 | 5/1978 | Jessop et al. | |

Primary Examiner—Benedict V. Safourek
Attorney, Agent, or Firm—John T. O'Halloran; Alfred C. Hill

[57] ABSTRACT

An arrangement and method of aligning a digital transmission system receiver to an incoming redundant ternary line signal (6B4T code) which combines detection of an excessive number of code violations with detection of a large number of prohibited ternary words (i.e. redundant ternary words not allocated to a binary equivalent. This results in elimination of spurious realignments of the receiver coupled with rapid realignment when necessary with no disturbance to the output timing during realignment.

5 Claims, 3 Drawing Figures

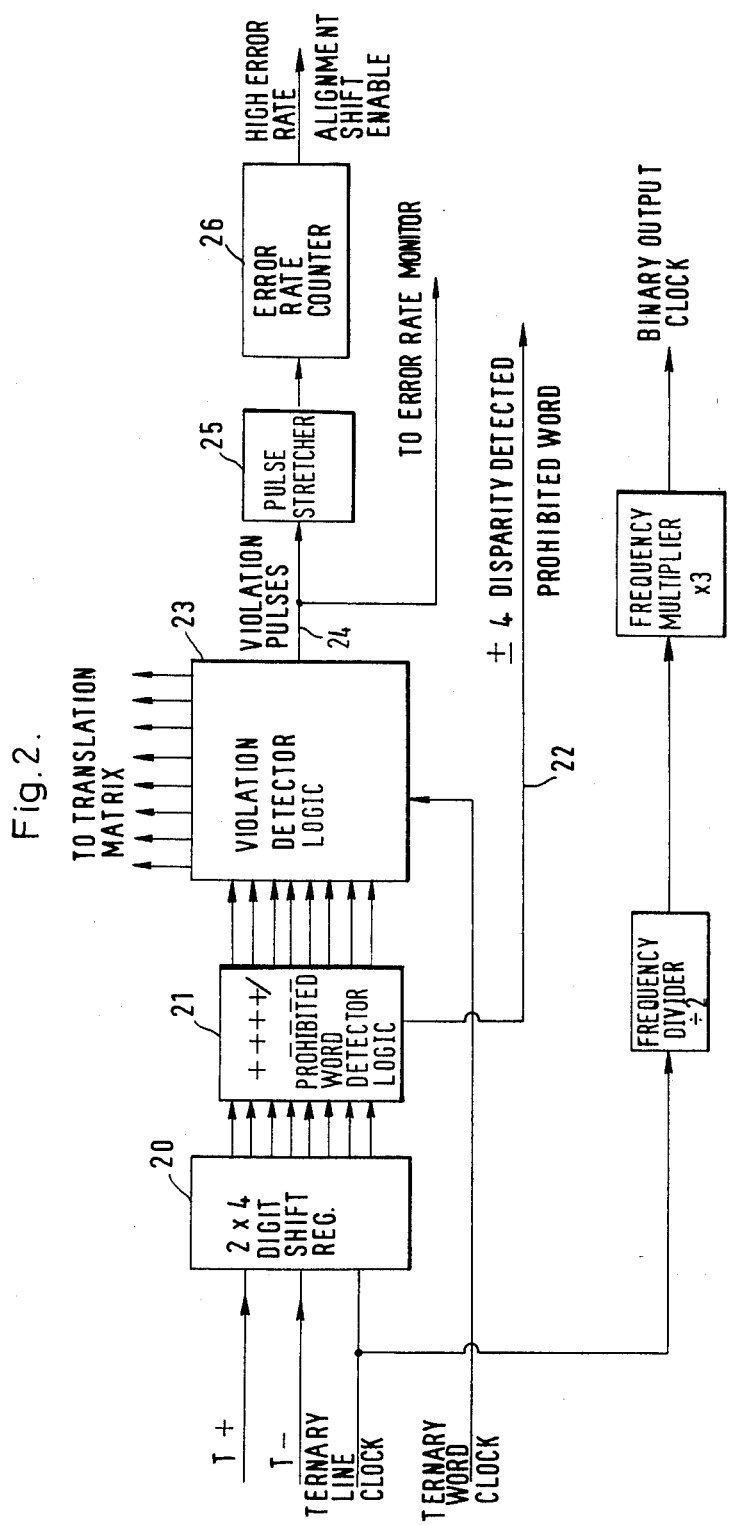

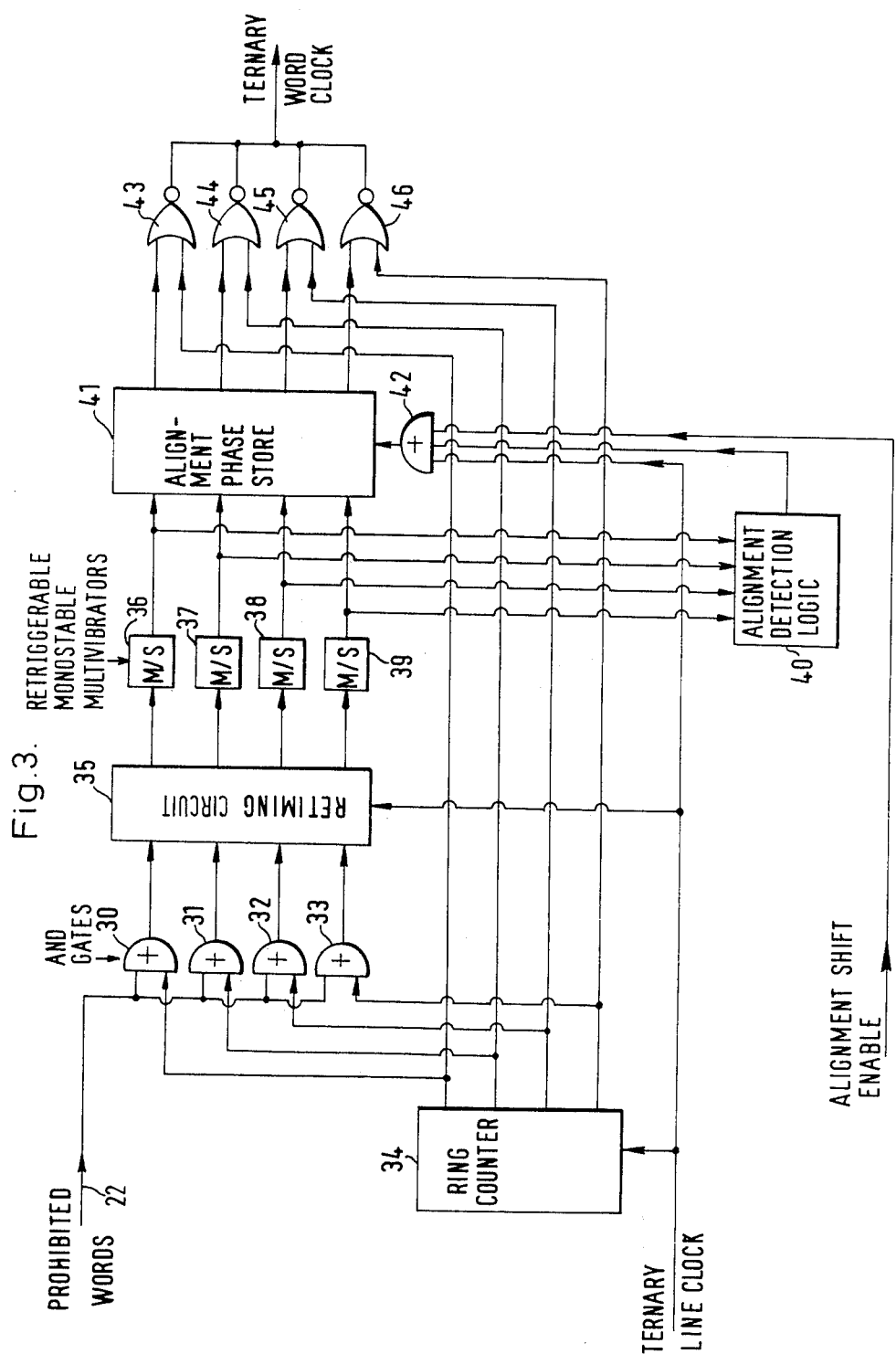

RECEIVER WORD ALIGNMENT FOR DIGITAL TRANSMISSION SYSTEMS USING A REDUNDANT TERNARY LINE CODE

BACKGROUND OF THE INVENTION

This invention relates to a method and means for achieving receiver word alignment in digital transmission systems using redundant ternary line codes.

The use of redundant ternary line codes for digital transmission systems is well known. For example U.S. Pat. No. 3,611,141, whose disclosure is incorporated herein by reference, discloses a terminal, for a data transmission system, including a transmitter and a receiver, the transmitter having means for converting groups of binary digit signals into ternary digit signal groups each having either zero disparity or a disparity of one polarity only, means for inverting selected ternary groups having disparity of the one polarity into ternary groups having disparity of the opposite polarity, means for determining the cumulative disparity of the ternary signal output of the inverter and means for inhibiting the action of the inverter when the cumulative disparity of the ternary signal output of the terminal is of the opposite polarity, the receiver having means for converting zero disparity ternary groups into groups of binary digits, means for converting ternary groups with disparity of one polarity into binary groups and means for converting ternary groups with disparity of the opposite polarity into binary groups corresponding to ternary groups of the one polarity disparity which are the inverse of the ternary groups with the opposite polarity disparity. It is possible to determine misalignment in systems using such redundant codes by virtue of the fact that a misaligned receiver will apparently be receiving ternary words containing an excessive number of violations of the coding rules. Furthermore, any such misaligned receiver will apparently be receiving ternary words containing an excessive number of violations of the coding rules and, additionally, any such misaligned receiver will apparently be receiving a number of prohibited words, i.e. ternary words which do not have binary code group equivalents.

SUMMARY OF THE INVENTION

An object of the present invention is to provide a method and an arrangement for achieving receiver word alignment in digital transmission systems using redundant ternary line codes.

A feature of the present invention is the provision of a method of aligning a digital transmission system receiver to incoming redundant ternary line code signals comprising the steps of: determining whether ternary code words of the line code signals, as-identified by timing control signals of the receiver, exceed a predetermined rate of ternary encoding rule violations; determining the rates at which, if the predetermined rate is exceeded, the different ternary code phases include prohibited ternary code words, where the term "phases" is defined as the plurality of possible first digit in a ternary code word and a prohibited ternary code word is a redundant ternary code word not allocated to a binary equivalent; and shifting time control signals of the receiver to align the receiver with that ternary code phase having the lowest rate of the prohibited ternary code words if that phase is different from the phase to which the receiver is already aligned.

Another feature of the present invention is the provision of an arrangement for aligning a digital transmission receiver to incoming redundant ternary line code signals comprising: first means coupled to the incoming signals to detect the presence of prohibited code words in different phases of the incoming signals and to produce a prohibited word signal, where the term "phases" is defined as the plurality of possible first digit in a ternary code word and a prohibited ternary code word is a redundant ternary code word not allocated to a binary equivalent; second means coupled to the first means to indicate when the accumulated disparity of the incoming signals, identified by timing control signals of the receiver, exceeds limits imposed by ternary encoding rules and to produce an alignment shift enable signal when the limits are exceeded; and third means coupled to the first and second means responsive to the prohibited word signal and the alignment shift enable signal for selecting the phase having the lowest number of the prohibited code words if the rate at which the indications occur exceeds a predetermined level and to adjust the timing signals of the receiver for alignment thereof by the selected phase.

In any digital transmission system using groups of digits to form what are known as words, with the digits of the words being transmitted serially, unless special provisions are made to indicate the beginning or ending of each word, it is possible to select erroneously any n-1 out of n consecutive digits as the first digit of n-digit word. In other words, there are n possible starting points in a serial digit stream composed of consecutive n-digit words. Only one of these starting positions will always result in a correct n-digit word according to the line code in use (assuming the signals to be error free). These n starting points are hereinafter referred to as "phases". In a 4-digit ternary code there are 4 phases, only one of which will consistently yield 4-digit ternary words. In practice if there are errors in the received signals it may appear, erroneously, that for one or a few words there is more than one phase yielding a valid word. Also, even in an error free digit stream it may be that certain sequences of digits briefly simulate valid words in more than one phase. However, such sequences will only exist for short periods of time before the misalignment becomes apparent.

BRIEF DESCRIPTION OF THE DRAWING

Above-mentioned and other features and objects of this invention will become more apparent by reference to the following description taken in conjunction with the accompanying drawings, in which:

FIG. 2 is a block diagram illustrating the code violation and error rate detection arrangements in a receiver according to the principles of the present invention; and FIG. 3 is a block diagram illustrating the phase selecting arrangements in a receiver according to the principles of the present invention.

DESCRIPTION OF THE PREFERRED EMBODIMENT

Figure 1:
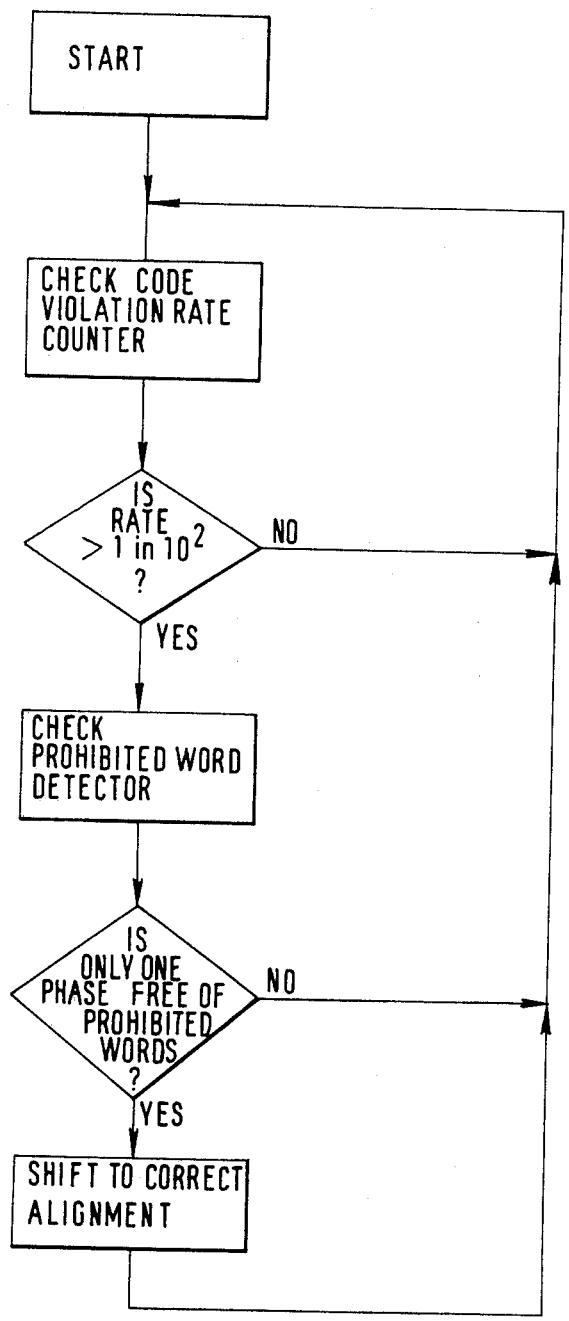
FIG. 1 is a flow-sheet illustrating the method according to the principles of the present invention.

The following description of an embodiment of the invention relates to a receiver in a so-called "6B4T transmission system", that is one in which binary encoded information for transmission over the system is translated into ternary encoded line signals on the basis that each consecutive group of 6 binary digits (6B) is translated into an equivalent group of 4 ternary digits (4T) in accordance with the rules set out in U.S. Pat. No. 3,611,141. For this purpose, it is convenient to refer to a translation table (not shown herein) setting out the permissable ternary equivalents for the different binary groups. One of the properties of the 6B4T line code is that it is relatively easy to determine at the receiver when violations of the code translating rules occur in the signals being processed in the receiver. These violations can of course be due to errors in the incoming line signals but, assuming the line signals are error free—which in practice they are for most of the time—the violations are more likely to be due to misalignment of the receiver. A single method of determining code translation violations is to monitor the accumulated disparity of the signals in the receiver. The rate at which such violations occur gives a useful indication as to whether they are due to line signal errors or to misalignment in the receiver. In practice, a violation rate exceeding 1 in 100 words is indicative of receiver misalignment. This method is shown in FIG. 1 where the first step in the flow sheet is to check the signals in the receiver for violations occurring at a high rate, e.g. more than 1 in 100 words. If the rate is less than this no realignment action is deemed necessary.

If the violation rate is above the predetermined level then the next step is to determine the presence of prohibited words in each of the available phases. Assuming no line signal errors, only one of the phases should be completely free of prohibited words. Prohibited words are ternary groups which do not occur in the translation table. The most obvious and easy to detect prohibited words are $++++$ and $----$, i.e. words which have the maximum disparity. A decision is then made as to which phase has no (or a low rate of) prohibited words. When a phase is found which has no (or a low rate of) prohibited words the last step is to shift the receiver timing control signals into immediate alignment with that phase. The receiver should now be correctly aligned.

In the receiver arrangement illustrated in FIGS. 2 and 3, the incoming ternary line signals, which are presented as positive or negative levels T+ and T−, respectively, (a zero level input is not shown—it will simply be a simultaneous lack of signal on both T+ and T− input lines), are clocked into a 2×4 digit shift register 20 (for the 6B4T case) under the control of a clock running at the ternary code digit rate. The contents of shift register 20 are read out in parallel after every digit and fed to detector logic 21 designed to detect $++++$ and $----$ sequences, i.e. maximum disparity sequences (prohibited words). If a prohibited word is detected, a signal is put out on line 22, which will be referred to again later. The parallel output from shift register 20 is also fed to a violation detector 23 where the disparity of the incoming ternary word is compared, under the control of the ternary word clock, with the accumulated disparity after the previous word and if the translation rules appear to be violated the digital sum is corrected and a violation pulse is generated on line 24. This pulse is stretched in a pulse stretching circuit 25 and then applied to a dividing binary counter 26. The amount of pulse stretching and the amount by which counter 26 divides are chosen to provide the desired error rate criteria. For example, in a 140 Mbit/s (binary rate) system, the ternary line signal clock is approximately 93 MHz (megahertz), the ternary word clock is approximately 23 MHz, the pulse stretcher output is 1.4 $\mu$s (microsecond) and counter 26 divides by eight to give the error rate output. If eight or more pulses from the pulse stretcher circuit 25 are counted within 20 $\mu$s then the alignment shift circuit will be enabled. The 1.4 $\mu$s pulse stretcher circuit 25 increases the receiver's immunity to sporadic error bursts by concealing violations that have an interval of less than approximately 130 digits. The count of eight stretched violation pulses in 20 $\mu$s ensures a 99.9% probability of detecting misalignment within that period. Of course, although the alignment shift circuits may be enabled by the output from counter 26 this does not necessarily mean that an alignment shift will take place since account must also be taken of the output on line 22. As has been explained above, detector 21 continuously monitors the incoming ternary words for $++++$ and $----$ sequences. When one of these prohibited words is detected and a pulse of one line signal clock period is generated on line 22, indicative of a prohibited word in the line signals, this is fed to a set of four AND gates 30–33 (FIG. 3). These AND gates also receive, in sequence, pulses corresponding to the timing of the four phases in the line signals. These four pulses are obtained by dividing the ternary line signal clock in a 4-bit ring counter 34. Thus, one or more of gates 30–33 is opened at the corresponding phase in the line signal, assuming that there is a pulse on line 22. The output(s) of the AND gates are retimed in retiming circuit 35, under the control of the ternary line clock, and applied to retriggerable monostable multivibrators (M/S) 36–39, each having, in the present example, a period of 40 $\mu$s, representing a sequence of approximately 1000 ternary words. In a correctly aligned receiver, three out of four phases, being in effect misaligned, will have prohibited words occurring at an average rate of 1 in 100 words, whereas the fourth phase, being the only correctly aligned phase, will only have occasional prohibited words caused by errors. Thus, line 22 should have, in a correctly aligned receiver, a sequence of three consecutive pulse periods (each being one line signal period in duration) with an average probability of 1 in 100 of containing a digit followed by one pulse period when there is (or should be) no pulse. Consequently, three of the monostable multivibrators 36–39 should be in a continuous triggered state and one should be in an untriggered state (or triggered only infrequently when errors occur in the ternary line signals). A valid alignment condition can, therefore, be detected at any given instant by alignment detection logic 40.

The outputs of monostable multivibrators 36–39 are also fed to an alignment phase store 41, which also receives the ternary line signal clock, the output of the error rate counter 26, and the output of the alignment detection logic 40. These last three signals are gated in via AND gate 42. Store 41 holds "valid" alignment information derived from the outputs of monostable multivibrators 36–39. The contents of store 41 can only be updated by an output from gate 42 when the following conditions exist:

(i) The line code violation detector 23 shows an error rate greater than 1 in 100; and (ii) A "valid" condition exists at the outputs of the four monostables (one untriggered, three triggered).

Since all four signal phases are being continuously monitored in parallel, in the event of misalignment occurring, the receiver will shift immediately to the correct phase as soon as the above two conditions are fulfilled, indicating that the misalignment is in fact a "genuine" misalignment.

The outputs of monostable multivibrators 36-39 which are held in the store are then taken to a set of four NOR gates 43-46 where they are strobed by the phase signals developed in counter 34. Since three of these outputs will be "set", i.e. in the same logic condition as the phase signals from counter 34, those three NOR gates will give no output while the fourth gate having one high and one low input will produce alignment timing pulses at the word clock rate. This alignment timing signal, being derived directly from the ternary line signal clock is independent of the realignment process.

While I have described above the principles of my invention in connection with specific apparatus it is to be clearly understood that this description is made only by way of example and not as a limitation to the scope of my invention as set forth in the objects thereof and in the accompanying claims.

I claim:

1. A method of aligning a digital transmission system receiver to incoming redundant ternary line code signals comprising the steps of:

determining whether ternary code words of said line code signals, as identified by timing control signals of said receiver, exceed a predetermined rate of ternary code translating rule violations;

determining the rates at which, if said predetermined rate is exceeded, the different ternary code phases include prohibited ternary code words, where the term "phases" is defined as the plurality of possible first digits in a ternary code word and a prohibited ternary code word is a redundant ternary code word not allocated to a binary equivalent; and shifting time control signals of said receiver to align said receiver with that ternary code phase having the lowest rate of said prohibited ternary code words if that phase is different from the phase to which said receiver is already aligned.

2. An arrangement for aligning a digital transmission receiver to incoming redundant ternary line code signals comprising:

first means coupled to said incoming signals to detect the presence of prohibited code words in different phases of said incoming signals and to produce a prohibited word signal, where the term "phases" is defined as the plurality of possible first digits in a ternary code word and a prohibited ternary code word is a redundant ternary code word not allocated to a binary equivalent;

second means coupled to said first means to indicate when the accumulated disparity of said incoming signals, identified by timing control signals of said receiver, exceeds limits imposed by ternary code translating rules and to produce an alignment shift enable signal when said limits are exceeded; and third means coupled to said first and second means responsive to said prohibited word signal and said misalignment shift enable signal for selecting the phase having the lowest number of said prohibited code words if the rate at which said indications occur exceeds a predetermined level and to adjust said timing signals of said receiver for alignment thereof by said selected phase.

3. An arrangement according to claim 2, wherein said first means includes a shift register coupled to said incoming signals having storage for $2n$ signals, where n is the number of digits in a ternary line code word, only said ternary signals having positive and negative disparity being read into said register serially at a ternary line digit rate, and first logic means coupled to said register to detect sequences of n consecutive ternary digits having the same polarity and to generate said prohibited word signal whenever one of said sequences is detected, the contents of said register being transferred in parallel to said first logic means at said line digit rate.

4. An arrangement according to claim 3, wherein said second means includes second logic means coupled to said first logic means into which the contents of said register are transferred in parallel at said line digit rate, second logic means comparing the disparity of the last received group of n digits with the disparity of the immediately preceding received group of n signals at the termination of each received ternary code group, as defined by said timing control signals of said receiver and to generate violation pulses of the relative disparities of the last and immediately preceding received groups violate said ternary code translating rules, fourth means coupled to said second logic means for stretching said violation pulses to a predetermined duration, and fifth means coupled to said fourth means to divide the number of said stretched pulses by a fixed number to produce said alignment shift enable pulse.

5. An arrangement according to claim 4, wherein said third means includes n two input AND gates each having one input coupled to said first logic means responsive to said prohibited word signal, sixth means having n outputs each coupled to a different one of the other input of said AND gates to cyclically enable said AND gates at said line digit rate, n monostable multivibrators each coupled to an output of a different one of said AND gates for triggering thereof, each of said multivibrators having the same predetermined time constant, alignment logic means coupled to an output of each of said multivibrator to detect a condition when $(n-1)$ of said multivibrators are triggered and one of said multivibrators is untriggered, coincident logic means coupled to said alignment logic means and said fifth means responsive to said line digit rate, said alignment shift enable signal and the output of said alignment logic means to select the output of said untriggered one of said multivibrators when there is coincidence between said line digit rate, said alignment shift enable signal and the output of said alignment logic means, and n NOR gates each coupled to the output of a different one of said multivibrators, the output of said coincidence logic means and a different one of said outputs of said sixth means.

* * * * *